United States Patent
Yang (10) Patent No.: US 8,422,466 B2
(45) Date of Patent: Apr. 16, 2013

(54) MULTIPLE NETWORK CONNECTIONS

(75) Inventor: Fan Yang, Helsinki (FI)

(73) Assignee: Nokia Corporation, Espoo (FI)

( * ) Notice: Subject to any disclaimer, the term of this patent is extended or adjusted under 35 U.S.C. 154(b) by 1344 days.

(21) Appl. No.: 11/986,919

(22) Filed: Nov. 26, 2007

(65) Prior Publication Data

US 2009/0135749 A1    May 28, 2009

(51) Int. Cl.
*H04W 4/00*    (2009.01)

(52) U.S. Cl.
USPC ........... 370/338; 370/339; 370/328; 370/329; 370/348; 370/349; 370/468; 370/469; 455/437; 455/452.2

(58) Field of Classification Search ................. None
See application file for complete search history.

(56) References Cited

U.S. PATENT DOCUMENTS

| | | | | |
|---|---|---|---|---|
| 5,396,543 A * | 3/1995 | Beeson et al. | ................ | 455/560 |
| 5,936,948 A * | 8/1999 | Sicher | ................ | 370/314 |
| 6,112,088 A * | 8/2000 | Haartsen | ................ | 455/437 |
| 6,385,179 B1 * | 5/2002 | Malcolm et al. | ................ | 370/329 |
| 6,385,451 B1 * | 5/2002 | Kalliokulju et al. | ................ | 455/437 |
| 6,393,008 B1 * | 5/2002 | Cheng et al. | ................ | 370/338 |
| 6,526,279 B1 * | 2/2003 | Dent | ................ | 455/437 |
| 6,584,108 B1 * | 6/2003 | Chung et al. | ................ | 370/401 |
| 6,711,178 B1 * | 3/2004 | O'Gorman et al. | ................ | 370/473 |
| 6,757,731 B1 * | 6/2004 | Barnes et al. | ................ | 709/227 |
| 6,947,435 B1 * | 9/2005 | Chikuma et al. | ................ | 370/412 |
| 7,068,291 B1 * | 6/2006 | Roberts et al. | ................ | 345/635 |
| 7,394,778 B2 * | 7/2008 | Kim | ................ | 370/312 |
| 7,415,535 B1 * | 8/2008 | Kuik et al. | ................ | 709/245 |
| 7,466,708 B2 * | 12/2008 | Hans et al. | ................ | 370/394 |
| 7,515,909 B2 * | 4/2009 | Jain et al. | ................ | 455/436 |
| 7,626,971 B2 * | 12/2009 | Noma | ................ | 370/342 |
| 7,693,122 B2 * | 4/2010 | Carlson et al. | ................ | 370/341 |
| 7,702,739 B1 * | 4/2010 | Cheng et al. | ................ | 709/207 |
| 7,711,366 B1 * | 5/2010 | O'Neil et al. | ................ | 455/438 |
| 7,869,461 B2 * | 1/2011 | Lohr et al. | ................ | 370/469 |
| 2002/0105949 A1 * | 8/2002 | Shinomiya | ................ | 370/386 |
| 2002/0131388 A1 * | 9/2002 | Ami et al. | ................ | 370/338 |
| 2003/0007517 A1 * | 1/2003 | Beckmann et al. | ................ | 370/537 |
| 2003/0119488 A1 * | 6/2003 | Hans et al. | ................ | 455/412 |
| 2004/0068560 A1 * | 4/2004 | Oulu et al. | ................ | 709/224 |
| 2004/0076181 A1 * | 4/2004 | Pantelias et al. | ................ | 370/468 |
| 2004/0151136 A1 * | 8/2004 | Gage | ................ | 370/328 |
| 2004/0156330 A1 * | 8/2004 | Yi et al. | ................ | 370/328 |
| 2005/0135311 A1 * | 6/2005 | Maillard | ................ | 370/331 |
| 2005/0201412 A1 * | 9/2005 | Janneteau et al. | ................ | 370/464 |
| 2006/0133295 A1 * | 6/2006 | Sakai et al. | ................ | 370/252 |
| 2007/0002832 A1 * | 1/2007 | Sylvain | ................ | 370/352 |
| 2007/0041343 A1 * | 2/2007 | Barreto et al. | ................ | 370/329 |
| 2007/0147424 A1 * | 6/2007 | Anigstein | ................ | 370/469 |
| 2007/0211648 A1 * | 9/2007 | Megarity et al. | ................ | 370/254 |

(Continued)

*Primary Examiner* — Ian N Moore
*Assistant Examiner* — Dung B Huynh
(74) *Attorney, Agent, or Firm* — Harrington & Smith (57) ABSTRACT

The invention provides a method, an apparatus, and a computer program for supporting multiple connections to a network or a plurality of networks. Support for multiple connections is enabled by establishing a connection of a first type to a network, receiving a request for a connection of the first type, registering a virtual connection as a response to receiving said request, receiving a request for establishing a connection of a second type through the virtual connection, associating the virtual connection with the connection of the first type, and establishing the connection of the second type through the connection of the first type.

18 Claims, 4 Drawing Sheets

U.S. PATENT DOCUMENTS

2007/0217411 A1* 9/2007 Danzeisen et al. ............ 370/389
2007/0230401 A1* 10/2007 Rayzman et al. ............. 370/331
2009/0088173 A1* 4/2009 Motegi et al. ................. 455/450
2009/0323605 A1* 12/2009 Umesh et al. ................. 370/329

* cited by examiner

MULTIPLE NETWORK CONNECTIONS

FIELD OF THE INVENTION

The present invention relates in general to multiple network connections and in particular, though not exclusively, to supporting applications' multiple connections to a network or a plurality of networks.

BACKGROUND OF THE INVENTION

Presently, mobile devices are capable of connecting to application services via a plurality of access networks and technologies. For example, a mobile device may support voice and/or data communication via second generation (2G), second-and-a-half generation (2.5G), and third generation (3G) mobile communication networks, such as Global System for Mobile communications (GSM), General Packet Radio Service (GPRS), and Universal Mobile Telecommunications System (UMTS), as well as via short-range radio access networks, such as Wireless Local Area Network (WLAN) and Bluetooth®. Some mobile devices are also capable of running multiple voice and/or data connections in parallel such that a mobile device may have a plurality of active connections open via a number of access networks.

A prevailing way of effecting data communication in today's data communication networks is by means of a packet-switched scheme e.g. by using the protocols of the Transmission Control Protocol/Internet Protocol (TCP/IP) protocol family. The packet-switched scheme is becoming commonplace also in voice communication, where voice data is carried in data packets over a packet-switched network, such as an IP network.

If an application run e.g. on a mobile device is to send data to and receive data from a server application that is running on a server located e.g. in an operator's core network or the Internet, a data communication session needs to be established between the mobile device and the server. Establishing a data communication session typically requires setup and configuration of transmission services on a number of layers of the OSI model, wherein some of the transmission services may be connection-oriented services and others connectionless services. For example, if a web browser of a mobile device is requested to retrieve the content of a web page from a web server via a WLAN access network, a data link layer connection (layer 2 or L2 connection) needs to be set up through the WLAN access network and configured accordingly.

If a plurality of applications are running on a mobile device such that several applications are connected to network services, e.g. to a web service or email service, multiple network access connections may be required. In some mobile devices, an application establishes L2 connections by using suitable means, such as by an Application Programming Interface (API) through which the application directly instructs set up and configuration of an L2 connection, or the setup and configuration of L2 connections are controlled by the operating system of the mobile device.

In order to reduce power consumption, a mobile device may initially be in a state where it is not attached to any network. A network attachment occurs when an L2 connection to a radio access network is initiated. This means, that the properties of the network and services available to the mobile device are not known prior to initiating the first L2 connection.

Presently, multiple connections to an access network are implemented as multiple single connections. This means, that if e.g. an application on a mobile device establishes two data communication connections through an access network, L2 connections are established for both data communication connections, and L3 connections (layer 3 or network layer connections) are directed through the L2 connections, respectively. The mobile device may also establish said L2 connections, even though data transmission has not yet started, i.e. the application may initiate the L2 connections to be assigned to the L3 connections later when a need for data transmission arises.

Access to a particular service may require a connection via a certain network. For example, access to a company's intranet may require a VPN (Virtual Private Network) connection in the form of IPSec (IP Security Architecture) tunneling between a communication device and an access gateway of the company's network, and some networks may not allow IPSec tunneling. Some of the networks available to the communication device may also meet a user's preferences, such as those pertaining to communication costs, better than other networks. In such situations, a user of the communication device may have to choose, which network to use, i.e. the user may have to choose, to which network an application establishes an L2 connection.

Mobile devices are typically also capable of roaming. For example, a mobile device that supports WLAN and GPRS may be able to migrate a data communication connection from a WLAN to a GPRS network and vice versa. When migrating a connection from one access network to another, which a mobile device has not accessed earlier, the mobile device may encounter a situation essentially similar to that the mobile device encounters when initiating the first connection after a state where the mobile device is not attached to a network. In other words, properties of the target network and services available to the mobile device are not known prior to migrating the connection.

SUMMARY

The present invention aims at addressing particularly, but not exclusively, the issues discussed above. According to a first aspect of the invention there is provided a method, which comprises establishing a connection of a first type to a network, receiving a request for a connection of the first type, registering a virtual connection as a response to receiving said request, receiving a request for establishing a connection of a second type through the virtual connection, associating the virtual connection with the connection of the first type, and establishing the connection of the second type through the connection of the first type.

According to a second aspect of the invention there is provided an apparatus comprising a communication interface unit configured to operate at least one communication connection, and a processing unit configured to establish through the communication interface unit a connection of a first type to a network, to receive a request for a connection of the first type, to register a virtual connection as a response to receiving said request, to receive a request for establishing a connection of a second type through the virtual connection, to associate the virtual connection with the connection of the first type, and to establish the connection of the second type through the connection of the first type.

According to a third aspect of the invention there is provided a computer program product stored on a computer-readable medium, wherein the computer program comprises program code operable to be loaded into the memory of and executed on a computing apparatus, the program code having been configured to enable, when executed, the computing apparatus to establish a connection of a first type to a network, to receive a request for a connection of the first type, to register a virtual connection as a response to receiving said request, to receive a request for establishing a connection of a second type through the virtual connection, to associate the virtual connection with the connection of the first type, and to establish the connection of the second type through the connection of the first type.

According to a fourth aspect of the invention there is provided an apparatus comprising means for operating at least one communication connection, means for establishing the connection of a first type to a network, means for receiving a request for a connection of the first type, means for registering a virtual connection as a response to receiving said request, means for receiving a request for establishing a connection of a second type through the virtual connection, means for associating the virtual connection with the connection of the first type, and means for establishing the connection of the second type through the connection of the first type.

The method, the apparatus, and the computer program product may be used to establish communication connections by using virtual connections. Applications may establish or cause to be established virtual connections, which may be mapped to real connections, on which data sent and received by the applications is carried.

Various exemplary embodiments of the present invention are described in dependent claims appended hereto. These embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
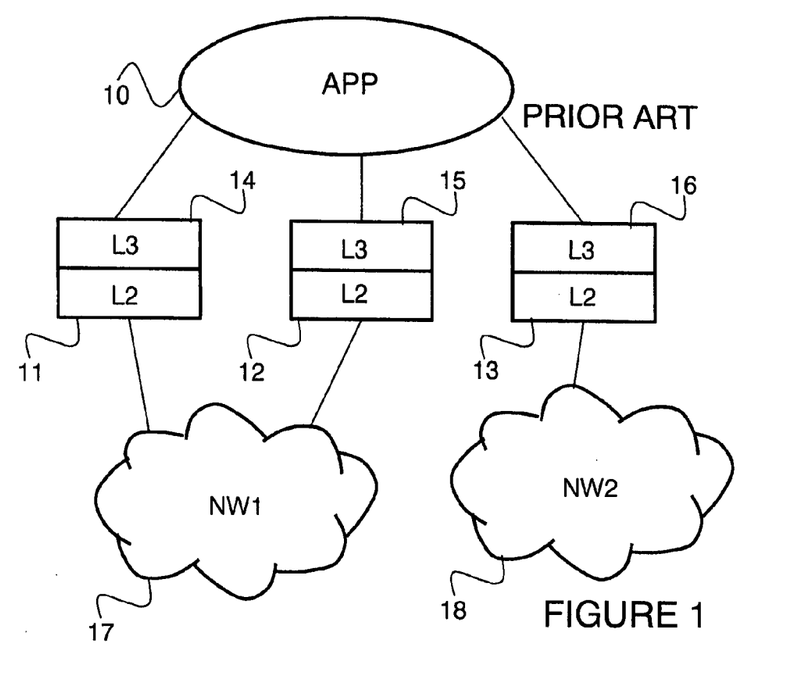
FIG. 1 shows a schematic picture of an application's multiple network connections according to prior art.

FIG. 1 illustrates an example of how an application's multiple network connections are effected according to the state of the art. In FIG. 1, an application 10 establishes two connections to a first network 17 and one connection to a second network 18. The application 10 first requests establishment of a layer 3 (L3) connection by means of a suitable Application Programming Interface (API), which causes the communication protocol package of the system to establish and possibly configure a lower layer, for example layer 2 (L2) connection. For example, in the case the application 10 is a web browser, which is configured to retrieve content from a web server by using the Hypertext Transfer Protocol (HTTP), the HTTP as an application layer protocol requests initiation of a L3 IP connection to a web server by means of a TCP socket API.

The application 10 is also configured to initiate L2 connections directly by using a suitable API. For example, in the case of a Symbian operating system, the application 10 requests L2 and L3 connections through RConnection and RSocket APIs, respectively.

As shown in FIG. 1, according to the state of the art the application 10 establishes or causes to be established separate L2 connections 11, 12, 13 for each communication connection the application 10 activates. The application 10 has activated two connections to the first network 17 and one connection to the second network 18. For these connections, the application has two L2 connections 11, 12 at least through the access network of the first network 17, and runs an L3 connection 14, 15 through each of the L2 connections 11, 12. The application 10 has one L2 connection 13 at least through the access network of the second network 18, and runs an L3 connection 16 through the L2 connection 13. As is seen in FIG. 1, the two connections to the first network 17 are effected as two single connections.

Figure 2:
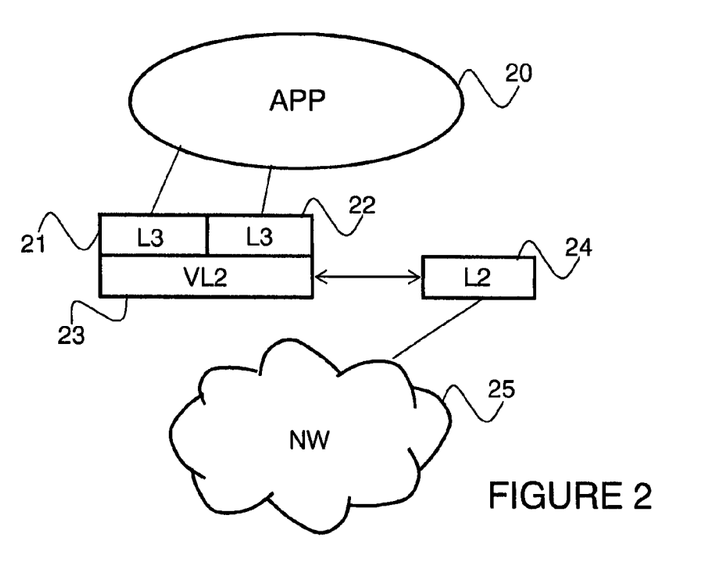
FIG. 2 depicts an example of an application's multiple network connections according to an embodiment of the present invention.
Figure 5:
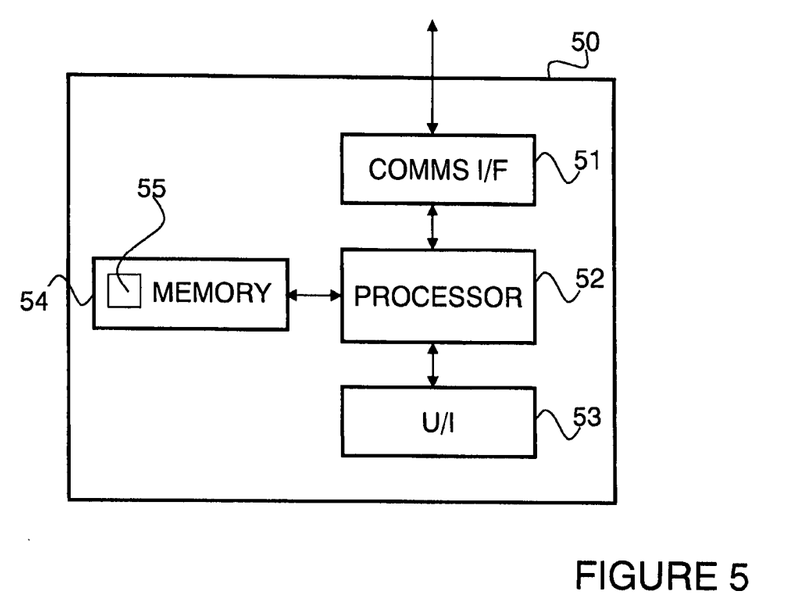
FIG. 5 shows an outline of the structure of an apparatus on which an embodiment of the invention may be implemented.

FIG. 2 illustrates an embodiment of the present invention by reference to some hierarchical elements of an apparatus in communication with a network 25. An example of an apparatus suitable for use in the environment of FIG. 2 is shown in FIG. 5. FIG. 2 shows an L2 connection 24 to a network 25. The L2 connection 24 may be initiated by an application 20 directly through an API as described above, or the L2 connection 24 may be initiated by e.g. a network access computer program 55 (see FIG. 5) of the apparatus, on which the application 20 is running. For example, in the case of a mobile device with Symbian operating system, the application 20 may initiate the L2 connection through RConnection API, which eventually causes the network interface manager included in the network access computer program 55 of FIG. 5 to set up and configure the L2 connection 24, or the network interface manager may be instructed by the network access computer program 55 of FIG. 5 in the process of initiating the L2 connection. L2 connection establishment will be explained further hereinafter together with another embodiment of the invention.

FIG. 2 also shows a virtual L2 connection 23 and two L3 connections 21, 22 associated with the virtual L2 connection 23. In this document, a virtual connection generally refers to an abstract representation of a physical or logical connection, which can be registered in a system and associated with a real physical or logical connection. In stead of initiating a real L2 connection, a virtual L2 connection 23 may be registered by e.g. a connection management system as a response to the application 20 requesting an L2 connection, if the application 20 e.g. has not yet started data transmission and therefore has not initiated any L3 connection. The virtual L2 connection 23 is associated with the real L2 connection 24. When the application 20 starts data transmission and initiates an L3 connection 21, 22 for it, the L3 connection 21, 22 is directed through the real L2 connection 24 by means of the association between the virtual L2 connection 23 and the real L2 connection 24.

As described hereinbefore, the real L2 connection 24 may be initiated by the application 20 or a connection management system. The real L2 connection 24 may be initiated prior to registering the virtual L2 connection 23 or after said registration. The virtual L2 connection 23 is associated with an available real L2 connection by means of e.g. a connection table maintained by a connection management system. A real L2 connection suitable for the application 20 may become available as a result of establishing a new real L2 connection or migrating an old L2 connection to a new network, which meets the requirements of the application 20.

The L2 connection 24 may be used to investigate properties of and services available in the network 25, as will be described further hereinafter.

As an example, the application may be a web browser, and the network 25 may represent e.g. a radio access network, such as WLAN or GPRS. The L2 connection 24 represents a layer 2 connection to said radio access network. The L3 connection 21, 22 may be e.g. a layer 3 service, such as IP session.

Figure 3:
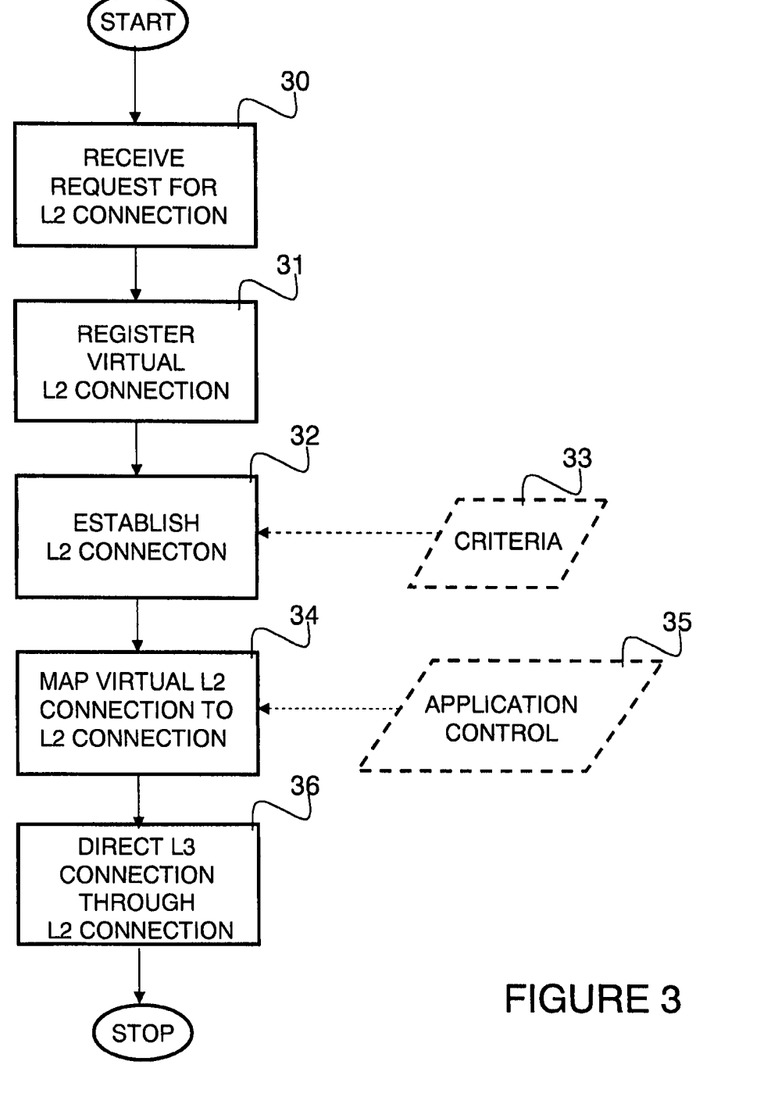
FIG. 3 shows a flow diagram of a method according to an embodiment of the invention.

Reference is now made to FIG. 3, which illustrates an example of a method according to an embodiment of the invention. In step 30, a request for an L2 connection is received. The object of the request may be a real or a virtual L2 connection. In step 31, a virtual L2 connection is registered as a response to receiving said request. In step 32, an L2 connection is established. The L2 connection may be established such that it conforms to at least a portion of predetermined criteria 33. In step 34, the virtual L2 connection is mapped to the L2 connection. Said mapping may be controlled 35 by an application that initiated the request for the L2 connection. In step 36, an L3 connection, which is requested such that it uses the virtual L2 connection, is established and directed through the L2 connection.

The predetermined criteria 33 controlling the establishment of the L2 connection in step 32 may be determined by a communication profile. The communication profile may comprise a default profile, a user profile, or a profile defined by a network operator, or any combination of said profiles or portions thereof. A network operator may modify the operator-defined profile e.g. by means of configuration commands sent via the network. If needed, the network operator may also modify the default profile and/or the user profile in a similar manner. Any of said profiles or portions thereof may also be provided by the operator e.g. on a SIM (Subscriber Identity Module) card, a Universal Subscriber Identity Module (USIM), or a corresponding memory or smart card.

The predetermined criteria 33 used in step 32 may be for example connection quality, such as radio link quality and available L3 Quality of Service (QoS), availability of security features, such as IPSec (IP Security Architecture) tunneling, communication costs, and access to other networks. In an embodiment, the connection quality is determined in terms of e.g. bit/frame error rate, available bit and/or symbol rate, transmission power, packet loss rate, transmission delay, jitter, or any combination thereof.

If a second request for a L2 connection is received according to step 30, a second virtual L2 connection may be registered according to step 31, and the second virtual L2 connection may also be mapped to the L2 connection according to step 34. The second virtual L2 connection may be mapped to the L2 connection when the L2 connection corresponds to the second request for an L2 connection. For example, the second virtual L2 connection may be mapped to the L2 connection in case of the L2 connection meeting the criteria associated with the requested L2 connection. This second mapping may be controlled 35 by an application that initiated the second request. The object of the second request for an L2 connection may be a real L2 connection or a virtual L2 connection. Mapping of two virtual L2 connections to a common L2 connection results in two applications sharing the common L2 connection. A skilled person appreciates that a number of virtual L2 connections may be mapped to a common L2 connection, thus allowing said number of applications to share a common L2 connection.

A second L3 connection may be requested to be established through the second virtual L2 connection. In case of the second virtual L2 connection having been mapped to the L2 connection, the second L3 connection may be established and directed through the L2 connection according to step 36.

In step 32, the L2 connection may be initiated by an application e.g. by means of a suitable API, or the L2 connection may be initiated by a connection management system, as discussed hereinbefore. In the latter case, the connection management system may assign the L2 connection to a particular application, or the L2 connection may be available to a number of applications for the purpose of mapping thereto virtual L2 connections registered for said applications. Typically, each application has one virtual L2 connection registered for it. The applications may establish L3 connections through the L2 connection by means of the mapping, if the L2 connection meets the criteria for the applications' L2 and/or L3 connections.

Applications may be configured to be in control of the mapping of the virtual L2 connections to real L2 connections such that an application may e.g. decide, to which real L2 connection the application's virtual L2 connection is mapped, or the application may determine, whether to register a virtual L2 connection or initiate a real L2 connection as a response to a request for an L2 connection.

It should be noted that the method steps depicted in FIG. 3 are not necessarily carried out in the order shown in the figure. For example, establishment of the L2 connection, presented in step 32, may also be carried out prior to registering the virtual L2 connection (step 31) or receiving the request for an L2 connection (step 30).

Figure 4:
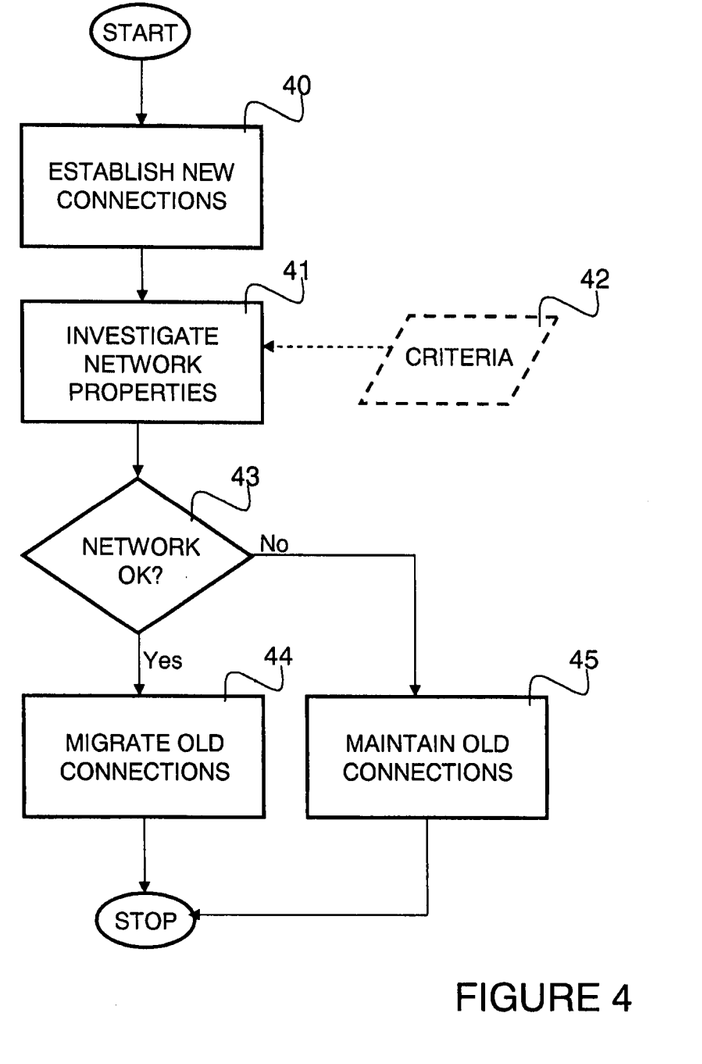
FIG. 4 shows a flow diagram of a method according to another embodiment of the invention.

Reference is now made to FIG. 4, which illustrates a further example of a method according to an embodiment of the invention. The exemplary method of FIG. 4 may be utilized e.g. in a situation, where a communication apparatus has an active L2 connection or active L2 connections to a network and needs to determine whether another network is suitable for the purpose of migrating the connection(s) to the other, or second network. The communication apparatus may also have active L3 connections through the L2 connection(s). In this document, an active connection generally refers to a connection that has been initiated and possibly, but not necessarily, associated with or bound to another connection. The communication apparatus may be for example a mobile device, and the first and second network may be for example a WLAN or GPRS network.

In step 40, an L2 connection and/or an L3 connection is initiated to the second network, which may be e.g. a WLAN or GPRS access network. The second network may be one, the properties of which are not known at the time of initiating the L2 and/or the L3 connection. The second network may e.g. not have been accessed earlier.

In step 41, properties of the second network are investigated such that at least one feature and/or service available in the second network is determined on the basis of information acquired from the second network by using the L2 connection and/or the L3 connection. The properties of the second network may be checked against predetermined criteria 42 to be met by the second network and/or the L2 or L3 connection.

The at least one feature or service may include e.g. connection quality, such as radio link quality and available L3 Quality of Service (QoS), availability of security features, such as IPSec tunneling, communication costs, and access to other networks through the second network. The connection quality may be determined in terms of e.g. bit/frame error rate, available bit and/or symbol rate, transmission power, packet loss rate, transmission delay, jitter, or the like.

In step 43, a determination is made as to whether the properties of the second network are such that the second network supports a desired mode of communication. Said determination may include the step of determining whether the second network meets at least a portion of the criteria 42. For example, it may be determined whether the second network supports a desired L3 QoS, whether connections to the Internet are allowed by a firewall, or whether the second network allows IPSec connections. A portion of the criteria 42 may represent mandatory requirements, and another portion may represent optional requirements. The criteria 42 may be determined by a communication profile in a similar manner as described hereinbefore.

If, in step 43, it is determined that the second network supports the desired communication mode, e.g. meets at least a portion of the criteria 42, active L2 and L3 connection(s) may be migrated to the second network in step 44. In case the determination in step 43 concludes that the second network does not support the desired communication mode, active connection(s) are maintained in the original network (step 45).

As an example, the L2 and possibly the L3 connection to the second network may be established and owned by a connection management system of the communication apparatus. The connection may be used by the communication management system to investigate the L2 and L3 properties of the second network. If an existing L2 connection is migrated to the second network (step 44 of FIG. 4), the L2 connection to the second network that is established by the communication management system, may be utilized in the migration process. For example, the connection management system may change the status of the L2 connection to the second network from a system-owned connection to an application-owned connection and assign the connection to an application either directly or via a virtual L2 connection registered for the application. The application and/or the connection management system may then redirect an existing L3 connection through the L2 connection assigned to the application. Alternatively, the application and/or the connection management system may have to disconnect an existing L3 connection that was using an L2 connection to the original network, and establish a new L3 connection that is directed through the L2 connection once the migration of the L2 connection to the second network has been completed.

Reference is now made to FIG. 5, which outlines the structure of an apparatus 50 on which embodiments of the invention may be implemented. The apparatus 50 may be for example a communication apparatus, such as a mobile phone, a mobile device, a user equipment, a personal computer, a laptop computer, a handheld computer, a Personal Digital Assistant (PDA), or the like.

The apparatus 50 may comprise a communication interface unit 51, a processing unit 52, a memory unit 54, and a user interface controller 53. The processing unit 52 is coupled to the communication interface unit 51, the memory unit 54, and the user interface controller 53. FIG. 5 also shows a network access computer program 55, which may be stored in the memory unit 54 as well as loaded into and executed in the processing unit 52. The network access computer program 54 is explained in detail hereinafter with reference to FIG. 6.

The communication interface unit 51 may be e.g. a radio interface module, such as a WLAN, Bluetooth, GSM/GPRS, CDMA, or WCDMA radio module, or a wired interface module, such as a LAN interface module. The communication interface unit 51 may be integrated into the apparatus 50 or into an adapter, card or the like that may be inserted into a suitable slot or port of the apparatus 50. The communication interface unit 51 may support one radio or wired interface technology or a plurality of technologies. FIG. 5 shows one communication interface unit 51, but the apparatus 50 may comprise a plurality of communication interface units 51.

The processing unit 52 may be e.g. a central processing unit (CPU), a microprocessor, a digital signal processor (DSP), a graphics processing unit, or the like. FIG. 5 shows one processing unit 52, but the apparatus 50 may comprise a plurality of processing units. The apparatus 50 may e.g. comprise a baseband processor and a multimedia processor.

The memory unit 54 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a memory or smart card, such as a SIM or USIM card, or the like. The apparatus 50 may comprise a plurality of memory units 54. The memory unit 54 may be formed as a part of the apparatus 50 or it may be inserted into a slot, port, or the like of the apparatus 50 by a user. The memory unit 54 may serve the sole purpose of storing data, or it may be effected as a part of a device serving other purposes, such as processing data.

The user interface controller 53, coupled to the processing unit 52, may comprise circuitry for receiving input from a user of the apparatus 50 e.g. via a keyboard, graphical user interface shown on the display of the apparatus 50, speech recognition circuitry, or an accessory device, such as a headset, and for providing output to the user via e.g. a graphical user interface or a loudspeaker.

A skilled person appreciates that in addition to the devices shown in FIG. 5, the apparatus 50 may comprise other devices, such as microphones, displays, as well as additional circuitry such as input/output (I/O) circuitry, memory chips, application-specific integrated circuits (ASIC), processing circuitry for specific purposes such as source coder/decoder circuitry, channel coding/decoding circuitry, cipher/decipher circuitry, and the like.

Figure 6:
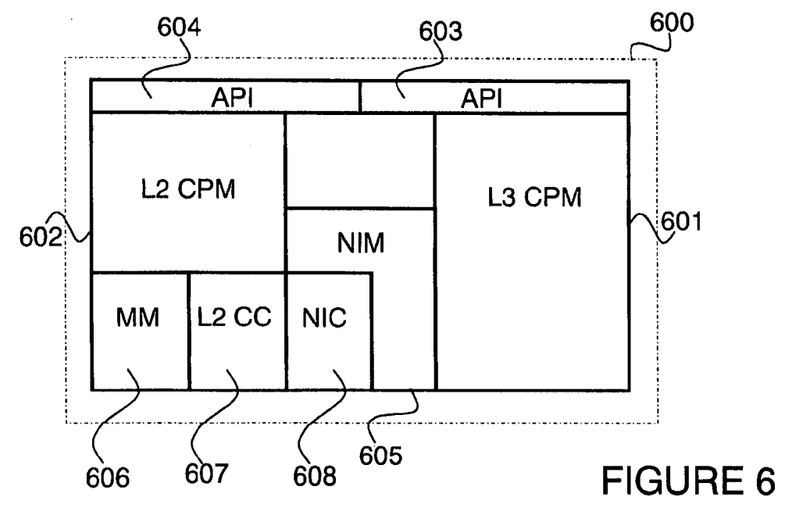
FIG. 6 depicts an example of a software architecture according to an embodiment of the invention.

Reference is now made to FIG. 6, which shows an example of a network access computer program 600 according to an embodiment of the invention. The network access computer program 600 is described herein by using the ESock program package of Symbian as an example, where applicable.

The network access computer program 600, when executed on a communication apparatus, may be part of the apparatus' connection management system, for example in the form of a process that enables establishment of communication connections for applications. For example, the ESock program package, when running on a communication apparatus, may effect a socket server that provides socket-based communication for applications.

The network access computer program 600 may comprise an application programming interface (API) 603, 604 arranged e.g. to receive requests from applications. For example, the ESock program package comprises RConnection and RSocket APIs, through which an application may request establishment of L2 and L3 connections, respectively.

The network access computer program 600 may further comprise an L2 connection processing module (L2 CPM) 602, an L3 connection processing module (L3 CPM) 601, and a network interface management module (NIM) 605. For example, the ESock program package comprises Connection Provider for processing L2 connections, Protocol Stack for processing L3 connections, and Network Interface Manager (Nifman) module for managing layer 2 interfaces.

The L2 connection processing module 602 may further comprise a mobility management module (MM) 606 for e.g.

managing the maintenance and migration of a communication apparatus' L2 connections, and a L2 connection control module (L2 CC) 607 for controlling creation and removal of L2 connections. For example, the Connection Provider module of ESock program package comprises Mobility Policy Manager representing the mobility management module 606 and Bearer Manager module representing the L2 connection control module 607.

The network interface management module 605 may further comprise a network interface configuration module (NIC) 608 for creation of L2 connections by initiating a network agent and setting configuration parameters with respect to each L2 connection. The configuration parameters may comprise e.g. IP configuration parameters, such as a device, gateway, and name server IP address associated with an L2 connection. For example, the Nifman module of ESock comprises Network Interface (NIF) module corresponding to the network interface configuration module 608.

An embodiment of the invention is now described with references to FIGS. 5 and 6 and by using the ESock program package of Symbian as an example, where applicable.

An application running on the apparatus 50 may request initiation of an L2 connection by using the API 604 of the network access computer program 600, for example the RConnection API of the ESock. The application may request the L2 connection e.g. as a response to a user of the application initiating a request for retrieval of the content of a web page, either from the internet or from a company intranet by using a web browser. The application may request a real L2 connection or a virtual L2 connection.

The L2 connection request is received by the network access computer program 600, which may forward the request for processing to the connection processing module 602. The connection processing module 602 may register a virtual L2 connection as a response to receiving and processing said request. The registration may be effected e.g. by the mobility management module 606 creating an entry for the virtual L2 connection in a table of a database. The table or the database may be stored in the memory unit 54. The mobility management module 606 may register a virtual L2 connection for the application even though the application requests a real L2 connection. The mobility management module 606 may notify the application, via the network access computer program 600, of the registration of the virtual L2 connection, once the registration has been completed.

The L2 connection control module 607 may request the network interface configuration module 605 to initiate and configure an L2 connection to a suitable network. For example, if a user of a web browser has requested retrieval of a web page content from the internet, the L2 connection control module 607 may request the network interface configuration module 605 to establish and configure an L2 connection to a public WLAN hotspot, which may provide internet connectivity at a low cost or free of charge. The configuration of the L2 connection may include requesting IP configuration parameters from a IP configuration server, such as a DHCP (Dynamic Host Configuration Protocol) server, a Mobile IP server, or a HIP (Host Identity Protocol) server.

The selection of the network, to which the L2 connection control module 607 requests the network interface configuration module 605 to establish the L2 connection, may be controlled by the mobility management module 606. The mobility management module 606 may select the network on the basis of preferences determined by a communication profile in a manner described hereinbefore. The mobility management module 606 may retrieve the communication profile or portions thereof from the memory unit 54, or the communication profile or portions thereof may be provided to the mobility management module 606 by an application requesting establishment of an L2 connection. The application may provide the communication profile e.g. as a part or in conjunction with the request through the API 604.

As another example, a user of a web browser may have requested retrieval of a web page from a server residing in a company intranet, and access to the company intranet may require establishment of a virtual private network (VPN) connection, e.g. an IPSec tunnel, to the access gateway of the company intranet. In such a case the mobility management module 606 may not be able to select an available public WLAN hotspot for the L2 connection, if the WLAN hotspot does not allow IPSec tunneling. The mobility management module 606 may then instruct the L2 connection control module 607 to establish the L2 connection to a mobile operator's GPRS network, for example, through which establishment of an IPSec tunnel is allowed. The mobility management module may keep a record of active L2 connections and their properties.

Once the virtual L2 connection has been registered for the application, the application may request initiation of an L3 connection through the virtual L2 connection to a target address. The application may have been notified by e.g. the mobility management module 606 of the registration of the virtual L2 connection. The application may request the L3 connection e.g. by using the API 603 of the network access computer program 600. The application may include in the request or provide otherwise to the network access computer program 600 an identification of the virtual L2 connection registered for the application. The application may also provide to the network access computer program 600 an access group identifier, which may be in association with a particular L2 interface.

The L3 connection request is received by the network access computer program 600. Once the network access computer program 600 has received the L3 connection request, it may request from the mobility management module 606 an identifier of a real L2 connection, through which the L3 connection will be directed. The request may include the identifier of the virtual L2 connection registered for the application and the access group identifier. The mobility management module 606 may then check, if there are active L2 connections corresponding to the application's requirements and/or the access group. The mobility management module may identify the application by using the virtual L2 connection identifier associated with the virtual L2 connection registered for the application. The application's requirements may be determined by a communication profile in a manner described hereinbefore.

If there is an active real L2 connection that corresponds to the application's requirements and the access group, the mobility management module 606 may associate the real L2 connection with the application's virtual L2 connection e.g. by means of a table or database entry, and may send an identifier of the real L2 connection to the network access computer program 600. If there are no such active real L2 connections available, the mobility management module 606 may initiate creation of a suitable real L2 connection in a manner described hereinbefore. Once the creation of the real L2 connection is complete, the mobility management module 606 may associate the real L2 connection to the virtual L2 connection registered for the application and send the identifier of the real L2 connection to the network access computer program 600.

Once the network access computer program 600 has received the identifier of the real L2 connection, it may send to the L3 connection processing module 601 a request for initiation of an L3 connection for the application. The request may comprise the identifier of the real L2 connection. The L3 connection processing module 601 may register an L3 connection for the application and return an identifier of the L3 connection to the network access computer program 600. The network access computer program 600 may then forward the identifier of the L3 connection to the application in a response to the application's request for establishing the L3 connection.

The mobility management module 606 may modify a communication profile associated with an application according to configuration commands received by e.g. the network access computer program 600 from a network via the communication interface unit 51.

The mobility management module 606 may associate a real L2 connection with virtual connections of plurality of applications. Thus, a plurality of applications may use a single real L2 connection by means of a virtual L2 connections registered for the applications such that an application's virtual L2 connection is associated with the real L2 connection in case of the real L2 connection meeting the criteria for the application's L2 and/or L3 connection. When an application has its virtual L2 connection associated with the real L2 connection, the application may establish an L3 connection through the real L2 connection.

For example, when a web browser accesses a public web service, such as a web search engine, the web browser may initiate a virtual L2 connection, which may then be associated with a real L2 connection established through a public WLAN hotspot, and an L3 connection may then be established through the real L2 connection by using the association. If another instance of the web browser accesses another public web service, the other instance of the web browser may initiate another virtual L2 connection, which is also associated with the real L2 connection to the public WLAN hotspot, and an L3 connection of the other instance of the web browser may be established through the common real L2 connection. In other words, in a scenario where two or more applications have substantially similar criteria for an L2 and/or L3 connection, the applications' respective virtual L2 connections may be associated with a common real L2 connection, and thus the applications may share a common real L2 connection.

On the other hand, the other web browser instance may access e.g. the web service of a bank and require a secure connection, such as an IPSec connection to the web service. In this case, the web browser instance may also initiate a virtual L2 connection, but the virtual L2 connection may not be associated with a real L2 connection to a public WLAN hotspot, if the WLAN hotspot does not allow secure connections. In this scenario, a new real L2 connection may be initiated through another access network, for example an operator WLAN, which allows secure connections, and the web browser instance's virtual L2 connection may be associated with the new real L2 connection. Alternatively, the real L2 connection established to the public WLAN hotspot may be migrated in a manner described hereinafter to a network that allows secure connections. After said migration, the virtual L2 connection of the web browser instance that accesses the web bank may be associated with the migrated real L2 connection.

In an embodiment, an application may control, with which real L2 connection the application's virtual L2 connection is associated. The application may include in a request for an L2 connection an identifier of the desired real L2 connection.

The mobility management module 606 may initiate creation of a system-owned real L2 connection to a new network in a manner described hereinbefore for the purpose of investigating the new network's properties. The mobility management module 606 may also request from the L3 connection processing module 601 establishment of an L3 connection through the system-owned L2 connection. The request may include an identifier of the system-owned real L2 connection. The mobility management module 606 may then determine, on the basis of discovered properties of the new network, whether the new network corresponds to the requirements of an application having an active L3 connection through a real L2 connection to another network. If the new network meets the requirements of the application, the mobility management module 606 may initiate migration of the real L2 connection from the other network to the new network. The mobility management module 606 may instruct the L2 connection control module 607 to request from the network interface configuration module 608 removal of the old L2 connection and creation and configuration of a new L2 connection to the new network. The mobility management module may then update the association of the application's virtual L2 connection and notify the application of the migration. The L3 connection processing module 601 may have to disconnect and re-establish the application's L3 connection through the new real L2 connection.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

I claim:

1. A method comprising:
    establishing a connection of a first type to a network;
    receiving a request for a connection of the first type;
    registering a virtual connection as a response to receiving said request;
    receiving a request for establishing a connection of a second type through the virtual connection;
    associating the virtual connection with the connection of the first type; and
    establishing the connection of the second type through the connection of the first type;
    the method further comprising:
    establishing a second connection of the first type to a second network;
    establishing a second connection of the second type to the second network through the second connection of the first type established to the second network;
    investigating properties of the second network through at least one of the second connection of the first type and the second connection of the second type and determining at least one feature of the second network on the basis of information acquired by means of the second connection of the first type or the second connection of the second type to the second network;

determining on the basis of the at least one feature of the second network, whether the second network meets criteria of the connection of the first type or the connection of the second type; and migrating, in case of the second network meeting said criteria, the connection of the first type to the second network and directing the connection of the second type through the connection of the first type, wherein said at least one feature of the second network comprises a L3 quality of service (QoS), availability of security features, communication costs or access to other networks through the second network; and further comprising, establishing the connection of the first type according to predetermined criteria, the predetermined criteria being determined by a default profile, a user profile, an operator-defined profile, or a combination of said profiles, and modifying any of the profiles according to configuration commands received from a network operator via a network.

2. A method according to claim 1, further comprising:
receiving a second request for a connection of the first type;
registering a second virtual connection as a response to receiving said second request; and
associating the second virtual connection with the connection of the first type in case of the connection of the first type corresponding to the second request for a connection of the first type.

3. A method according to claim 2, further comprising:
receiving a request for establishing a second connection of the second type through the second virtual connection; and
establishing the second connection of the second type through the connection of the first type in case of the second virtual connection having been associated with the connection of the first type.

4. A method according to claim 1, wherein the connection of the first type comprises a layer 2 connection and the connection of the second type comprises a layer 3 connection.

5. A method according to claim 1, wherein the connection of the first type is assigned to an application.

6. A method according to claim 5, wherein the connection of the second type is initiated by the application and established through the connection of the first type assigned to the application.

7. A method according to claim 5, wherein the application controls the association of the virtual connection with the connection of the first type.

8. A method according to claim 1, wherein the connection of the first type is available to a plurality of applications for association of virtual connections thereto.

9. A method according to claim 1, wherein the at least one feature comprises at least one of connection quality, service quality, and service availability.

10. An apparatus comprising:
a communication interface unit configured to operate at least one communication connection;
a processing unit configured to:
establish through the communication interface unit a connection of a first type to a network;
receive a request for a connection of the first type;
register a virtual connection as a response to receiving said request;
receive a request for establishing a connection of a second type through the virtual connection;
associate the virtual connection with the connection of the first type; and
establish the connection of the second type through the connection of the first type;
where said processing unit is further configured to establish a second connection of the first type to a second network;
establish a second connection of the second type to the second network through the second connection of the first type established to the second network;
investigate properties of the second network through at least one of the second connection of the first type and the second connection of the second type and determine at least one feature of the second network on the basis of information acquired by means of the second connection of the first type or the second connection of the second type to the second network;
determine on the basis of the at least one feature of the second network, whether the second network meets criteria of the connection of the first type or the connection of the second type; and
migrate, in case of the second network meeting said criteria, the connection of the first type to the second network and directing the connection of the second type through the connection of the first type,
wherein said at least one feature of the second network comprises a L3 quality of service (QoS), availability of security features, communication costs or access to other networks through the second network;
where said processing unit is further configured to establish the connection of the first type according to predetermined criteria, the predetermined criteria being determined by a default profile, a user profile, an operator-defined profile, or a combination of said profiles, and to modify any of the profiles according to configuration commands received from a network operator via a network.

11. An apparatus according to claim 10, wherein the processing unit is further configured to:
receive a second request for a connection of the first type;
register a second virtual connection as a response to receiving said second request; and
associate the second virtual connection with the connection of the first type in case of the connection of the first type corresponding to the second request for a connection of the first type.

12. An apparatus according to claim 11, wherein the processing unit is further configured to:
receive a request for establishing a second connection of the second type through the second virtual connection; and
establish the second connection of the second type through the connection of the of the first type in case of the second virtual connection having been associated with the connection of the first type.

13. An apparatus according to claim 10, wherein the connection of the first type is a layer 2 connection and the connection of the second type is a layer 3 connection.

14. An apparatus according to claim 10, wherein the processing unit is further configured to assign the connection of the first type to an application.

15. An apparatus according to claim 10, wherein the processing unit is further configured to associate virtual connections of a plurality of applications to a connection of the first type.

16. An apparatus according to claim 10, wherein the processing unit is further configured to receive a request for associating a virtual connection to a connection of the first type and to associate the virtual connection to the connection of the first type according to the request.

17. A non-transitory computer readable medium that stores a computer program comprising program code operable to be executed on a computing apparatus, the program code having been configured to enable, when executed, the computing apparatus to:
- establish a connection of a first type to a network;
- receive a request for a connection of the first type;
- register a virtual connection as a response to receiving said request;
- receive a request for establishing a connection of a second type through the virtual connection;
- associate the virtual connection with the connection of the first type; and
- establish the connection of the second type through the connection of the first type;
- where said program code is further configured to enable, when executed, the computing apparatus to establish a second connection of the first type to a second network;
- establish a second connection of the second type to the second network through the second connection of the first type established to the second network;
- investigate properties of the second network through at least one of the second connection of the first type and the second connection of the second type and determine at least one feature of the second network on the basis of information acquired by means of the second connection of the first type or the second connection of the second type to the second network;
- determine on the basis of the at least one feature of the second network, whether the second network meets criteria of the connection of the first type or the connection of the second type; and
- migrate, in case of the second network meeting said criteria, the connection of the first type to the second network and directing the connection of the second type through the connection of the first type,
- wherein said at least one feature of the second network comprises a L3 quality of service (QoS), availability of security features, communication costs or access to other networks through the second network; and
- further comprising, establish the connection of the first type according to predetermined criteria, the predetermined criteria being determined by a default profile, a user profile, an operator-defined profile, or a combination of said profiles, and
- modify any of the profiles according to configuration commands received from a network operator via a network.

18. An apparatus comprising:
- means for establishing a connection of a first type to a network;
- means for receiving a request for a connection of the first type;
- means for registering a virtual connection as a response to receiving said request;
- means for receiving a request for establishing a connection of a second type through the virtual connection;
- means for associating the virtual connection with the connection of the first type; and
- means for establishing the connection of the second type through the connection of the first type;

the apparatus further comprising:
- means for establishing a second connection of the first type to a second network and for establishing a second connection of the second type to the second network through the second connection of the first type established to the second network;
- means for investigating properties of the second network through at least one of the second connection of the first type and the second connection of the second type and for determining at least one feature of the second network on the basis of information acquired by means of the second connection of the first type or the second connection of the second type to the second network;
- means for determining on the basis of the at least one feature of the second network, whether the second network meets criteria of the connection of the first type or the connection of the second type; and
- means for migrating, in case of the second network meeting said criteria, the connection of the first type to the second network and directing the connection of the second type through the connection of the first type,
- wherein said at least one feature of the second network comprises a L3 quality of service (QoS), availability of security features, communication costs or access to other networks through the second network;
- where said means for establishing a connection of a first type establishes the connection of the first type according to predetermined criteria, the predetermined criteria being determined by a default profile, a user profile, an operator-defined profile, or a combination of said profiles, and
- further comprising means for modifying any of the profiles according to configuration commands received from a network operator via a network.

* * * * *